Oct. 13, 1970 L. B. ROBINSON 3,534,274
CONTROL APPARATUS
Filed Sept. 3, 1968
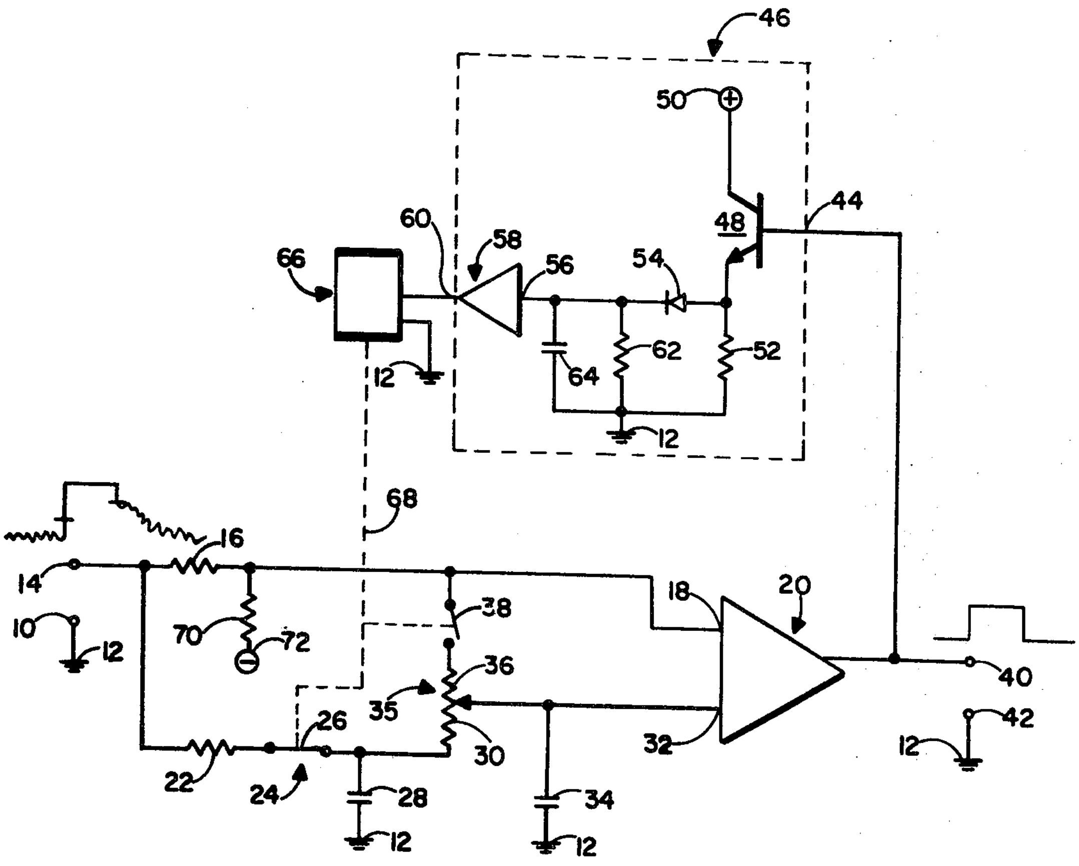
INVENTOR.
LESLIE B. ROBINSON
BY Bruce C Lutz
ATTORNEY United States Patent Office
3,534,274
Patented Oct. 13, 1970

3,534,274
CONTROL APPARATUS

Leslie B. Robinson, Edmonds, Wash., assignor to Honeywell Inc., Minneapolis, Minn., a corporation of Delaware Filed Sept. 3, 1968, Ser. No. 756,986
Int. Cl. H03b *1/00*
U.S. Cl. 328—164 9 Claims

ABSTRACT OF THE DISCLOSURE

A hysteresis switching circuit for squaring up distorted pulses which will switch to an ON condition when an input signal pulse rises a predetermined amount above the noise level of the incoming signal and will switch OFF when the input pulse falls a predetermined amount with respect to its maximum value.

The present invention is directed generally to electronic circuits and more specifically to a switching circuit.

While there are some switching circuits on the market that are of the hysteresis type, there are none known which utilize the concept of switching from a first to a second condition when the input signal rises a predetermined amount above the integrated average of the input noise and which will switch back to the first condition when the input signal falls a predetermined ratio with respect to the maximum. The turn-on and turn-off points are completely settable by circuit design so that the turn-off voltage can be either higher or lower than the turn-on voltage. For pulse squaring applications such as the circuit was originally designed for, the turn-off voltage would be somewhat higher than the turn-on voltage.

It is therefore an object of the present invention to provide an improved switching circuit.

Other objects and advantages of the present invention may be ascertained from a reading of the specification and appended claims in conjunction with the single drawing which is a schematic diagram of one embodiment of the invention.

In the drawing, a first input terminal 10 is connected to ground 12 while a second input terminal 14 is connected through a resistor 16 to a first input 18 of a differential operational amplifier or amplfying means designated as 20. Input terminal 14 is also connected through a resistor 22 to a normally closed switch generally designated as 24 and having a moveable contact 26. The other end of switch 24 is connected through a capacitor 28 to ground 12 and also is connected through a resistor portion 30 of a potentiometer 35 to a second input 32 of amplifier 20. A capacitor 34 is connected between input 32 and ground 12. Across the inputs 18 and 32 of amplifier 20 is a serial connection of a second resistor portion or impedance means 36 of potentiometer 35 and a normally open switch generally designated as 38. As shown, a wiper of potentiometer 35 is connected to input 32. An output of amplifier 20 is connected to a first output terminal 40 whereas the second output terminal 42 is connected to ground 12. Output terminal 40 is connected to an input 44 of a dash line block generally designated as 46 which contains a switch driver and timing logic. One circuit for providing this switch driver and timing logic is shown comprising an NPN transistor 48 connected to receive power from a positive power terminal 50 through its colector with its base connected to input 44 and an emitter connected through a resistor 52 to ground 12. The emitter of transistor 48 is also connected through a diode 54 from anode to cathode to an input 56 of an operation amplifier generally designated as 58 having an output connected to an output 60 of block 46. A resistor 62 is connected in parallel with a capacitor 64 between amplifier input 56 and ground 12. The output 60 of block 46 is connected to one input of a relay generally designated as 66 having its other input connected to ground 12. A mechanical output of relay 66 is connected to switches 24 and 38 such that an input signal applied to relay 66 will open switch 24 and close switch 38. This mechanical connection is shown by a dash line 68. A biasing means or resistive element 70 is connected between input 18 of amplifier 20 and a negative power terminal 72.

In the steady state condition with rectified incoming signals, the capacitor 28 as well as capacitor 34 will tend to charge to some positive value indicative of the integrated average of the noise signals. The bias voltage 72 will hold input 18 at a negative potential with respect to input 32. Thus, the input signal will have to rise some predetermined amount such as shown by the hash mark on the input waveform before this voltage will overcome that produced by bias potential 72 and the charge on capacitors 28 and 34 and therefore render input 18 positive with respect to input 32. At this point the output of differential amplifier 20 will switch and produce a positive going output which when acting through resistor 48 and amplifier 58 will switch relay 66 from the normal condition and thereby open switch 24 and close switch 38. Capacitor 28 therefore is held at the charge prior to the opening of switch 24. The input signal then proceeds to its maximum value. Since switch 38 is closed, capacitor 34 will charge to a potential equal to the ratio of the resistance of resistor 30 to the total resistance of resistors 30 and 36 times the peak voltage of the input signal plus the potential across capacitor 28. It can thus be seen that during the time of peak potential of the input signal the input 18 is somewhat more positive than input 32. When the input signal starts to drop, the capacitor 34 prevents sudden change of the potential at input 32. Thus, when the input drops below a value such as shown by the hash mark on the falling edge of the input signal, the input 18 suddenly becomes negative with respect to input 32 and thus amplifier 20 switches to an OFF condition. The voltage drop from the peak at which this switching occurs is the ratio of the resistance 36 to the total of 30 and 36 times the peak voltage of the input signal plus the voltage across capacitor 28.

It will be realized that with an input signal as distorted as the one shown, if the relay 66 were to return to its normal condition as soon as the input dropped below its predetermined value the distortion could conceivably be such that the input 18 would not always be negative with respect to input 32. To overcome this possible problem, a time delay for the turn-off condition has been inserted in block 46. While transistor 48 can turn ON and OFF very quickly, the diode 54 will only allow the turn-on pulse to be quickly transmitted to the amplifier 58. When transistor 48 turns OFF, the diode 54 is back biased and the amplifier 58 will not turn OFF until it is discharged through resistor 62.

In describing the single embodiment of the invention, power supplies have not been shown for the amplifiers 20 and 58 although it is realized that some sort of power is necessary. Also, although the signal being applied to input 14 was previously indicated as being rectified so that only positive inputs are received, it could also be rectified to merely receive negative inputs with appropriate changes in biasing. Further, within the scope of the invention, the circuit may be used merely as a pulse shaper, the circuitry using the capacitor 28 merely playing an inactive role in such a use. Of course, if the circuit were always to be used with unrectified inputs, the resistor 24 as well as capacitor 28 and switch 24 could be removed and the resistor 30 connected to ground so that the circuit will provide a positive going pulse at output 40 when the input signal is high enough with respect to ground to overcome the biasing means 72 and will then switch OFF when the input drops a predetermined ratio with respect to the maximum input signal.

Further, while the circuit has been shown as a means for squaring input pulses, the circuit can be used for other applications where some type of switching hysteresis is desired.

While other embodiments of the circuit will be apparent to those skilled in the art, I wish to be limited only by the scope of the following claims, wherein I claim:

1. Apparatus for improving pulse width definition comprising, in combination:
differential amplifier means including first and second input means and output means;
pulse means for supplying input pulses;
means, for only passing signals of greater than a predetermined amplitude, connected between said pulse means and said first input means;
first circuit means, including first switch means responsive to a control signal, connected between said pulse means and said second input means for applying to said second input means in the absence of a control signal a signal indicative of the average input of any signals supplied by said pulse means;
second circuit means, including switch means responsive to a control signal, connected to said second input means for applying signals thereto indicative of the input signal during the time period of any control signal, the signals being applied to said second input means through said second circuit means lagging those supplied to first input means; and
feedback means connected to said output means for supplying control signals to said first and second circuit means during the occurrence of a pulse at said output means of said amplifying means.

2. Apparatus as claimed in claim 1 wherein the feedback means additionally contains delay means for continuing application of said control signal for a predetermined time period after cessation of a pulse at said output means of said amplifying means.

3. Apparatus as claimed in claim 1 wherein; the means for passing signals comprises a biasing means, the first circuit means includes capacitive means for averaging the input signal, and the second circuit means utilizing capacitive means for causing the input signal to said second input means to lag that supplied to said first means.

4. Hysteresis type switching apparatus wherein the switching is variable with respect to received noise comprising, in combination:
a differential amplifier means including first and second input means and output means;
first signal means for supplying input signals to said first input means;
second means for normally supplying input signals to said second input means indicative of the integrated average value thereof;
biasing means connected to one of said input means of said amplifier means so that a switching signal applied to said amplifier means won't change the amplitude of an output signal from said amplifier means until said switching signal attains a predetermined amplitude with respect to said integrated average value; and
feedback means connected to said output means for connecting said second input means from second signal means to said first signal means until the switching signal drops a predetermined ratio from its maximum value.

5. Apparatus as claimed in claim 4 wherein said biasing means is connected to said first input means and said first and second signal means are connected together to receive the same signal.

6. Apparatus as claimed in claim 4 wherein the feedback means includes a time delay means to prevent reconnection for a predetermined time after the switching signal drops below its predetermined ratio from its maximum value.

7. Apparatus of the class described comprising, in combination:
differential amplifying means including first and second input means and output means;
signal input means for supplying distorted input pulses;
first means connected between said signal input means and said first input means of said amplifying means for biasing said first input means;
first impedance means and normally open switch means serially connected between said first and second input means of said differential amplifying means;
normally closed switch means and second impedance means serially connected between said signal input means and said second input means of said differential amplifier means;
logic circuit means connected between said output means of said differential amplifying means and said switch means for switching said switch means when signal appears at said output means and for returning said switch means to the normal condition a predetermined time after said signal is removed from said output means.

8. Apparatus as claimed in claim 7 comprising, in addition:
integrating means connected to said serial combination of said normally closed switch means and said impedance means for maintaining said second input means at the level of the integrated average of input supplied to said signal input means when said normally closed switch is passing signals to said second input means; and
capacitive means connected to said second input means of said amplifying means for preventing sudden changes of input signal amplitude at said second input means,
said first means preventing application of signals of less than a predetermined amplitude from being applied to said first input means, said integrating means normally maintaining said second input means at a given polarity with respect to said first input means from noise signals and said capacitive means maintaining said second input means at the opposite polarity with respect to said first input means after an input pulse drops greater than a predetermined amount from its peak.

9. Apparatus as claimed in claim 7 wherein said first means determines pulse rise amplitude for activating said amplifying means and the ratio of said first and second impedance means determines the fall from pulse peaks for deactivating said amplifying means.

References Cited

UNITED STATES PATENTS 2,555,440 6/1951 Gilbert ------------ 328—164

DONALD D. FORRER, Primary Examiner

B. P. DAVIS, Assistant Examiner

U.S. Cl. X.R.

307—229, 260, 268; 330—30

UNITED STATES PATENT OFFICE

Certificate of Correction

Patent No. 3,534,274 October 13, 1970

Leslie B. Robinson

It is certified that error appears in the above-identified patent and that said Letters Patent are hereby corrected as shown below.

In the grant (only) cancel the three sheets of drawings bearing Patent No. 3,533,274 and insert the attached sheet:

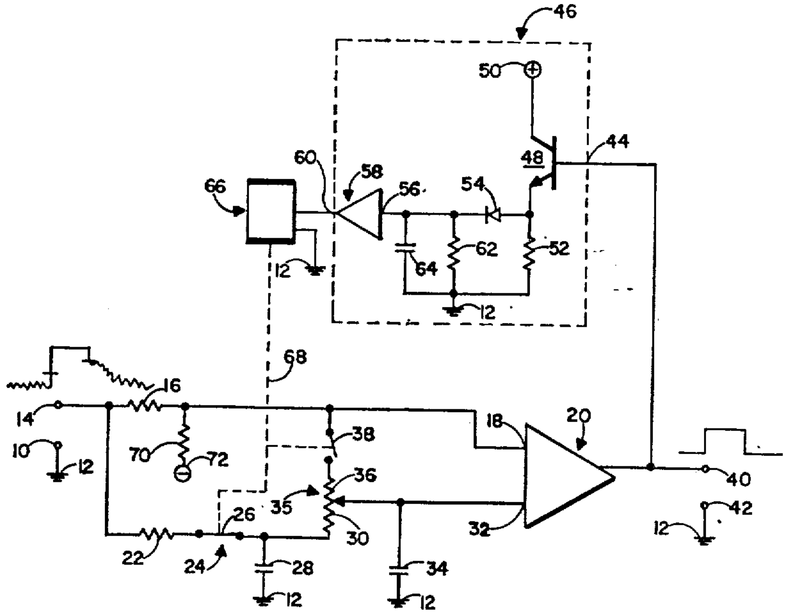

Signed and sealed this 7th day of March 1972.

[SEAL]

Attest:

EDWARD M. FLETCHER, JR.,
*Attesting Officer.*

ROBERT GOTTSCHALK,
*Commissioner of Patents.*